United States Patent
Adest et al.

(10) Patent No.: US 8,319,471 B2
(45) Date of Patent: Nov. 27, 2012

(54) BATTERY POWER DELIVERY MODULE

(75) Inventors: Meir Adest, Raanana (IL); Lior Handelsman, Givataim (IL); Yoav Galin, Raanana (IL); Amir Fishelov, Tel Aviv (IL); Guy Sella, Bitan Aharon (IL)

(73) Assignee: Solaredge, Ltd., Herzelia (IL)

( * ) Notice: Subject to any disclaimer, the term of this patent is extended or adjusted under 35 U.S.C. 154(b) by 1113 days.

(21) Appl. No.: 11/951,562

(22) Filed: Dec. 6, 2007

(65) Prior Publication Data
US 2008/0136367 A1    Jun. 12, 2008

Related U.S. Application Data

(60) Provisional application No. 60/868,851, filed on Dec. 6, 2006, provisional application No. 60/868,893, filed on Dec. 6, 2006, provisional application No. 60/868,962, filed on Dec. 7, 2006, provisional application No. 60/908,095, filed on Mar. 26, 2007, provisional application No. 60/916,815, filed on May 9, 2007.

(51) Int. Cl.
*H02J 7/00* (2006.01)
*H02J 1/12* (2006.01)
*H02H 7/10* (2006.01)
*H01L 29/66* (2006.01)

(52) U.S. Cl. ............. 320/103; 307/46; 307/64; 307/66; 363/50; 363/56.03; 363/56.05; 257/140; 257/491; 257/499

(58) Field of Classification Search .................. 320/103
See application file for complete search history.

(56) References Cited

U.S. PATENT DOCUMENTS

| | | | |
|---|---|---|---|
| 3,369,210 A | 7/1965 | Manickella |
| 3,596,229 A | 7/1971 | Hohorst |
| 4,060,757 A | 11/1977 | McMurray |
| 4,101,816 A | 7/1978 | Shepter |
| 4,171,861 A | 10/1979 | Hohorst |
| 4,452,867 A | 6/1984 | Conforti |
| 4,460,232 A | 7/1984 | Sotolongo |
| 4,481,654 A | 11/1984 | Daniels et al. |

(Continued)

FOREIGN PATENT DOCUMENTS

CN    1309451 A    8/2001
(Continued)

OTHER PUBLICATIONS

Alonso, R., "A New Distributed Converter Interface for PV Panels," 20th European Photovoltaic Solar Energy Conference, Jun. 6-10, 2005, Barcelona, Spain. pp. 2288-2291.

(Continued)

*Primary Examiner* — Yalkew Fantu
(74) *Attorney, Agent, or Firm* — Banner & Witcoff, Ltd.

(57) ABSTRACT

A system and method for digital management and control of power conversion from battery cells. The system utilizes a power management and conversion module that uses a CPU to maintain a high power conversion efficiency over a wide range of loads and to manage charge and discharge operation of the battery cells. The power management and conversion module includes the CPU, a current sense unit, a charge/discharge unit, a DC-to-DC conversion unit, a battery protection unit, a fuel gauge and an internal DC regulation unit. Through intelligent power conversion and charge/discharge operations, a given battery type is given the ability to emulate other battery types by conversion of the output voltage of the battery and adaptation of the charging scheme to suit the battery.

16 Claims, 3 Drawing Sheets

U.S. PATENT DOCUMENTS

| | | | |
|---|---|---|---|
| 4,554,515 A | 11/1985 | Burson et al. | |
| 4,598,330 A | 7/1986 | Woodworth | |
| 4,623,753 A | 11/1986 | Feldman et al. | |
| 4,637,677 A | 1/1987 | Barkus | |
| 4,641,042 A | 2/1987 | Miyazawa | |
| 4,641,079 A | 2/1987 | Kato et al. | |
| 4,644,458 A | 2/1987 | Harafuji et al. | |
| 4,652,770 A | 3/1987 | Kumano | |
| 4,783,728 A | 11/1988 | Hoffman | |
| RE33,057 E | 9/1989 | Clegg et al. | |
| 4,868,379 A | 9/1989 | West | |
| 4,888,063 A | 12/1989 | Powell | |
| 4,888,702 A | 12/1989 | Gerken et al. | |
| 4,899,269 A | 2/1990 | Rouzies | |
| 4,903,851 A | 2/1990 | Slough | |
| 4,987,360 A | 1/1991 | Thompson | |
| 5,045,988 A | 9/1991 | Gritter et al. | |
| 5,081,558 A | 1/1992 | Mahler | |
| 5,191,519 A | 3/1993 | Kawakami | |
| 5,280,232 A | 1/1994 | Kohl et al. | |
| 5,327,071 A | 7/1994 | Frederick et al. | |
| 5,345,375 A | 9/1994 | Mohan | |
| 5,402,060 A | 3/1995 | Erisman | |
| 5,446,645 A | 8/1995 | Shirahama et al. | |
| 5,460,546 A | 10/1995 | Kunishi et al. | |
| 5,493,154 A | 2/1996 | Smith et al. | |
| 5,497,289 A | 3/1996 | Sugishima et al. | |
| 5,517,378 A | 5/1996 | Asplund et al. | |
| 5,548,504 A | 8/1996 | Takehara | |
| 5,604,430 A | 2/1997 | Decker et al. | |
| 5,616,913 A | 4/1997 | Litterst | |
| 5,644,219 A | 7/1997 | Kurokawa | |
| 5,646,501 A | 7/1997 | Fishman et al. | |
| 5,659,465 A | 8/1997 | Flack et al. | |
| 5,686,766 A | 11/1997 | Tamechika | |
| 5,773,963 A | 6/1998 | Blanc et al. | |
| 5,777,515 A | 7/1998 | Kimura | |
| 5,780,092 A | 7/1998 | Agbo et al. | |
| 5,798,631 A | 8/1998 | Spee et al. | |
| 5,801,519 A | 9/1998 | Midya et al. | |
| 5,804,894 A | 9/1998 | Leeson et al. | |
| 5,821,734 A | 10/1998 | Faulk | |
| 5,822,186 A | 10/1998 | Bull et al. | |
| 5,838,148 A * | 11/1998 | Kurokami et al. | 323/299 |
| 5,869,956 A | 2/1999 | Nagao et al. | |
| 5,873,738 A | 2/1999 | Shimada et al. | |
| 5,886,890 A | 3/1999 | Ishida et al. | |
| 5,892,354 A | 4/1999 | Nagao et al. | |
| 5,905,645 A | 5/1999 | Cross | |
| 5,919,314 A | 7/1999 | Kim | |
| 5,923,158 A | 7/1999 | Kurokami et al. | |
| 5,932,994 A | 8/1999 | Jo et al. | |
| 5,933,327 A | 8/1999 | Leighton et al. | |
| 5,945,806 A * | 8/1999 | Faulk | 320/127 |
| 5,949,668 A | 9/1999 | Schweighofer | |
| 5,963,010 A | 10/1999 | Hayashi et al. | |
| 5,990,659 A | 11/1999 | Frannhagen | |
| 6,031,736 A | 2/2000 | Takehara et al. | |
| 6,038,148 A | 3/2000 | Farrington et al. | |
| 6,046,919 A | 4/2000 | Madenokouji et al. | |
| 6,050,779 A | 4/2000 | Nagao et al. | |
| 6,078,511 A | 6/2000 | Fasullo et al. | |
| 6,081,104 A | 6/2000 | Kern | |
| 6,082,122 A | 7/2000 | Madenokouji et al. | |
| 6,105,317 A | 8/2000 | Tomiuchi et al. | |
| 6,111,188 A | 8/2000 | Kurokami et al. | |
| 6,111,391 A | 8/2000 | Cullen | |
| 6,111,767 A | 8/2000 | Handleman | |
| 6,163,086 A | 12/2000 | Choo | |
| 6,166,455 A | 12/2000 | Li | |
| 6,166,527 A | 12/2000 | Dwelley et al. | |
| 6,169,678 B1 | 1/2001 | Kondo et al. | |
| 6,219,623 B1 | 4/2001 | Wills | |
| 6,255,360 B1 | 7/2001 | Domschke et al. | |
| 6,256,234 B1 | 7/2001 | Keeth et al. | |
| 6,259,234 B1 | 7/2001 | Perol | |
| 6,262,558 B1 | 7/2001 | Weinberg | |
| 6,285,572 B1 | 9/2001 | Onizuka et al. | |
| 6,301,128 B1 | 10/2001 | Jang et al. | |
| 6,304,065 B1 | 10/2001 | Wittenbreder | |
| 6,320,769 B2 * | 11/2001 | Kurokami et al. | 363/56.03 |
| 6,339,538 B1 | 1/2002 | Handleman | |
| 6,351,130 B1 | 2/2002 | Preiser et al. | |
| 6,369,462 B1 | 4/2002 | Siri | |
| 6,380,719 B2 | 4/2002 | Underwood et al. | |
| 6,396,170 B1 | 5/2002 | Laufenberg et al. | |
| 6,433,522 B1 | 8/2002 | Siri | |
| 6,448,489 B2 | 9/2002 | Kimura et al. | |
| 6,452,814 B1 | 9/2002 | Wittenbreder | |
| 6,493,246 B2 | 12/2002 | Suzui et al. | |
| 6,507,176 B2 | 1/2003 | Wittenbreder, Jr. | |
| 6,531,848 B1 | 3/2003 | Chitsazan et al. | |
| 6,545,211 B1 | 4/2003 | Mimura | |
| 6,548,205 B2 | 4/2003 | Leung et al. | |
| 6,590,793 B1 | 7/2003 | Nagao et al. | |
| 6,593,521 B2 | 7/2003 | Kobayashi | |
| 6,608,468 B2 | 8/2003 | Nagase | |
| 6,611,441 B2 | 8/2003 | Kurokami et al. | |
| 6,628,011 B2 | 9/2003 | Droppo et al. | |
| 6,650,031 B1 | 11/2003 | Goldack | |
| 6,650,560 B2 * | 11/2003 | MacDonald et al. | 363/142 |
| 6,653,549 B2 | 11/2003 | Matsushita et al. | |
| 6,672,018 B2 | 1/2004 | Shingleton | |
| 6,678,174 B2 | 1/2004 | Suzui et al. | |
| 6,690,590 B2 | 2/2004 | Stamenic et al. | |
| 6,731,136 B2 | 5/2004 | Knee | |
| 6,738,692 B2 | 5/2004 | Schienbein et al. | |
| 6,765,315 B2 * | 7/2004 | Hammerstrom et al. | 307/66 |
| 6,768,047 B2 | 7/2004 | Chang et al. | |
| 6,788,033 B2 | 9/2004 | Vinciarelli | |
| 6,795,318 B2 | 9/2004 | Haas et al. | |
| 6,801,442 B2 | 10/2004 | Suzui et al. | |
| 6,850,074 B2 | 2/2005 | Adams et al. | |
| 6,882,131 B1 | 4/2005 | Takada et al. | |
| 6,914,418 B2 | 7/2005 | Sung | |
| 6,919,714 B2 | 7/2005 | Delepaut | |
| 6,927,955 B2 | 8/2005 | Suzui et al. | |
| 6,933,627 B2 | 8/2005 | Wilhelm | |
| 6,936,995 B2 | 8/2005 | Kapsokavathis et al. | |
| 6,950,323 B2 | 9/2005 | Achleitner et al. | |
| 6,963,147 B2 | 11/2005 | Kurokami et al. | |
| 6,984,967 B2 | 1/2006 | Notman | |
| 6,984,970 B2 | 1/2006 | Capel | |
| 7,030,597 B2 | 4/2006 | Bruno et al. | |
| 7,031,176 B2 | 4/2006 | Kotsopoulos et al. | |
| 7,042,195 B2 | 5/2006 | Tsunetsugu et al. | |
| 7,046,531 B2 | 5/2006 | Zocchi et al. | |
| 7,053,506 B2 | 5/2006 | Alonso et al. | |
| 7,072,194 B2 | 7/2006 | Nayar et al. | |
| 7,079,406 B2 | 7/2006 | Kurokami et al. | |
| 7,087,332 B2 | 8/2006 | Harris | |
| 7,090,509 B1 | 8/2006 | Gilliland et al. | |
| 7,091,707 B2 | 8/2006 | Cutler | |
| 7,097,516 B2 | 8/2006 | Werner et al. | |
| 7,126,053 B2 | 10/2006 | Kurokami et al. | |
| 7,126,294 B2 | 10/2006 | Minami et al. | |
| 7,138,786 B2 | 11/2006 | Ishigaki et al. | |
| 7,148,669 B2 | 12/2006 | Maksimovic et al. | |
| 7,158,359 B2 | 1/2007 | Bertele et al. | |
| 7,158,395 B2 | 1/2007 | Deng et al. | |
| 7,174,973 B1 | 2/2007 | Lysaght | |
| 7,193,872 B2 | 3/2007 | Siri | |
| 7,218,541 B2 | 5/2007 | Price et al. | |
| 7,248,946 B2 | 7/2007 | Bashaw et al. | |
| 7,256,566 B2 | 8/2007 | Bhavaraju et al. | |
| 7,277,304 B2 | 10/2007 | Stancu et al. | |
| 7,282,814 B2 | 10/2007 | Jacobs | |
| 7,291,036 B1 | 11/2007 | Daily et al. | |
| RE39,976 E | 1/2008 | Schiff et al. | |
| 7,336,056 B1 | 2/2008 | Dening | |
| 7,348,802 B2 | 3/2008 | Kasanyal et al. | |
| 7,352,154 B2 | 4/2008 | Cook | |
| 7,371,963 B2 | 5/2008 | Suenaga et al. | |
| 7,372,712 B2 | 5/2008 | Stancu et al. | |
| 7,385,380 B2 | 6/2008 | Ishigaki et al. | |
| 7,385,833 B2 | 6/2008 | Keung | |
| 7,394,237 B2 | 7/2008 | Chou et al. | |

| Patent/Publication | Date | Name |
|---|---|---|
| 7,420,815 B2 | 9/2008 | Love |
| 7,435,134 B2 | 10/2008 | Lenox |
| 7,435,897 B2 | 10/2008 | Russell |
| 7,471,014 B2 | 12/2008 | Lum et al. |
| 7,504,811 B2 | 3/2009 | Watanabe et al. |
| 7,589,437 B2 | 9/2009 | Henne et al. |
| 7,600,349 B2 | 10/2009 | Liebendorfer |
| 7,602,080 B1 | 10/2009 | Hadar et al. |
| 7,605,498 B2 | 10/2009 | Ledenev et al. |
| 7,646,116 B2 | 1/2010 | Baraseh et al. |
| 7,719,140 B2 | 5/2010 | Ledenev et al. |
| 7,748,175 B2 | 7/2010 | Liebendorfer |
| 7,759,575 B2 | 7/2010 | Jones et al. |
| 7,763,807 B2 | 7/2010 | Richter |
| 7,780,472 B2 | 8/2010 | Lenox |
| 7,782,031 B2 | 8/2010 | Qiu et al. |
| 7,787,273 B2 | 8/2010 | Lu et al. |
| 7,804,282 B2 | 9/2010 | Bertele |
| 7,812,701 B2 | 10/2010 | Lee et al. |
| 7,839,022 B2 | 11/2010 | Wolfs |
| 7,843,085 B2 | 11/2010 | Ledenev et al. |
| 7,868,599 B2 | 1/2011 | Rahman et al. |
| 7,880,334 B2 | 2/2011 | Evans et al. |
| 7,893,346 B2 | 2/2011 | Nachamkin et al. |
| 7,900,361 B2 | 3/2011 | Adest et al. |
| 7,919,953 B2 | 4/2011 | Porter et al. |
| 7,948,221 B2 | 5/2011 | Watanabe et al. |
| 7,952,897 B2 | 5/2011 | Nocentini et al. |
| 7,960,650 B2 | 6/2011 | Richter et al. |
| 8,003,885 B2 | 8/2011 | Richter et al. |
| 8,004,116 B2 | 8/2011 | Ledenev et al. |
| 8,004,117 B2 | 8/2011 | Adest et al. |
| 8,013,472 B2 | 9/2011 | Adest et al. |
| 8,077,437 B2 | 12/2011 | Mumtaz et al. |
| 8,093,756 B2 | 1/2012 | Porter et al. |
| 8,093,757 B2 | 1/2012 | Wolfs |
| 2001/0023703 A1 | 9/2001 | Kondo et al. |
| 2002/0044473 A1 | 4/2002 | Toyomura et al. |
| 2002/0056089 A1 | 5/2002 | Houston |
| 2003/0058593 A1 | 3/2003 | Bertele et al. |
| 2003/0066076 A1 | 4/2003 | Minahan |
| 2003/0075211 A1 | 4/2003 | Makita et al. |
| 2003/0080741 A1 | 5/2003 | LeRow et al. |
| 2003/0214274 A1 | 11/2003 | Lethellier |
| 2004/0041548 A1 | 3/2004 | Perry |
| 2004/0061527 A1 | 4/2004 | Knee |
| 2004/0125618 A1 | 7/2004 | De Rooij |
| 2004/0140719 A1 | 7/2004 | Vulih et al. |
| 2004/0169499 A1 | 9/2004 | Huang et al. |
| 2004/0201279 A1 | 10/2004 | Templeton |
| 2004/0201933 A1 | 10/2004 | Blanc |
| 2004/0246226 A1 | 12/2004 | Moon |
| 2005/0002214 A1 | 1/2005 | Deng et al. |
| 2005/0005785 A1 | 1/2005 | Poss et al. |
| 2005/0017697 A1 | 1/2005 | Capel |
| 2005/0057214 A1 | 3/2005 | Matan |
| 2005/0057215 A1 | 3/2005 | Matan |
| 2005/0068820 A1 | 3/2005 | Radosevich et al. |
| 2005/0099138 A1 | 5/2005 | Wilhelm |
| 2005/0103376 A1 | 5/2005 | Matsushita et al. |
| 2005/0105224 A1 | 5/2005 | Nishi |
| 2005/0162018 A1 | 7/2005 | Realmuto et al. |
| 2005/0172995 A1 | 8/2005 | Rohrig et al. |
| 2005/0226017 A1 | 10/2005 | Kotsopoulos et al. |
| 2006/0001406 A1 | 1/2006 | Matan |
| 2006/0017327 A1 | 1/2006 | Siri et al. |
| 2006/0034106 A1 | 2/2006 | Johnson |
| 2006/0038692 A1 | 2/2006 | Schnetker |
| 2006/0053447 A1 | 3/2006 | Krzyzanowski et al. |
| 2006/0066349 A1 | 3/2006 | Murakami |
| 2006/0068239 A1 | 3/2006 | Norimatsu et al. |
| 2006/0108979 A1 | 5/2006 | Daniel et al. |
| 2006/0113843 A1 | 6/2006 | Beveridge |
| 2006/0113979 A1 | 6/2006 | Ishigaki et al. |
| 2006/0118162 A1 | 6/2006 | Saelzer et al. |
| 2006/0132102 A1 | 6/2006 | Harvey |
| 2006/0149396 A1 | 7/2006 | Templeton |
| 2006/0162772 A1 | 7/2006 | Presher, Jr. et al. |
| 2006/0163946 A1 | 7/2006 | Henne et al. |
| 2006/0171182 A1 | 8/2006 | Siri et al. |
| 2006/0174939 A1 | 8/2006 | Matan |
| 2006/0185727 A1 | 8/2006 | Matan |
| 2006/0192540 A1 | 8/2006 | Balakrishnan et al. |
| 2006/0208660 A1 | 9/2006 | Shinmura et al. |
| 2006/0227578 A1 | 10/2006 | Datta et al. |
| 2006/0237058 A1 | 10/2006 | McClintock et al. |
| 2007/0044837 A1 | 3/2007 | Simburger et al. |
| 2007/0075711 A1 | 4/2007 | Blanc et al. |
| 2007/0081364 A1 | 4/2007 | Andreycak |
| 2007/0147075 A1 | 6/2007 | Bang |
| 2007/0159866 A1 | 7/2007 | Siri |
| 2007/0164750 A1 | 7/2007 | Chen et al. |
| 2007/0165347 A1 | 7/2007 | Wendt et al. |
| 2007/0205778 A1 | 9/2007 | Fabbro et al. |
| 2007/0227574 A1 | 10/2007 | Cart |
| 2007/0236187 A1 | 10/2007 | Wai et al. |
| 2007/0273342 A1 | 11/2007 | Kataoka et al. |
| 2008/0024098 A1 | 1/2008 | Hojo |
| 2008/0080177 A1 | 4/2008 | Chang |
| 2008/0088184 A1 | 4/2008 | Tung et al. |
| 2008/0097655 A1 | 4/2008 | Hadar et al. |
| 2008/0106250 A1 | 5/2008 | Prior et al. |
| 2008/0115823 A1 | 5/2008 | Kinsey |
| 2008/0143188 A1 | 6/2008 | Adest et al. |
| 2008/0143462 A1 | 6/2008 | Belisle et al. |
| 2008/0144294 A1 | 6/2008 | Adest et al. |
| 2008/0147335 A1 | 6/2008 | Adest et al. |
| 2008/0150366 A1 | 6/2008 | Adest et al. |
| 2008/0164766 A1 | 7/2008 | Adest et al. |
| 2008/0179949 A1 | 7/2008 | Besser et al. |
| 2008/0236647 A1 | 10/2008 | Gibson et al. |
| 2008/0236648 A1 | 10/2008 | Klein et al. |
| 2008/0238195 A1 | 10/2008 | Shaver et al. |
| 2008/0246460 A1 | 10/2008 | Smith |
| 2008/0246463 A1 | 10/2008 | Sinton et al. |
| 2009/0066399 A1 | 3/2009 | Chen et al. |
| 2009/0073726 A1 | 3/2009 | Babcock |
| 2009/0084570 A1 | 4/2009 | Gherardini et al. |
| 2009/0097172 A1 | 4/2009 | Bremicker et al. |
| 2009/0102440 A1 | 4/2009 | Coles |
| 2009/0140715 A1 | 6/2009 | Adest et al. |
| 2009/0141522 A1 | 6/2009 | Adest et al. |
| 2009/0190275 A1 | 7/2009 | Gilmore et al. |
| 2009/0206666 A1 | 8/2009 | Sella et al. |
| 2009/0224817 A1 | 9/2009 | Nakamura et al. |
| 2009/0282755 A1 | 11/2009 | Abbott et al. |
| 2009/0322494 A1 | 12/2009 | Lee |
| 2010/0052735 A1 | 3/2010 | Burkland et al. |
| 2010/0085670 A1 | 4/2010 | Palaniswami et al. |
| 2010/0139743 A1 | 6/2010 | Hadar et al. |
| 2010/0214808 A1 | 8/2010 | Rodriguez |
| 2010/0244575 A1 | 9/2010 | Coccia et al. |
| 2010/0269430 A1 | 10/2010 | Haddock et al. |
| 2010/0282290 A1 | 11/2010 | Schwarze et al. |
| 2010/0308662 A1 | 12/2010 | Schatz et al. |
| 2011/0006743 A1 | 1/2011 | Fabbro |
| 2011/0043172 A1 | 2/2011 | Dearn |
| 2011/0084553 A1 | 4/2011 | Adest et al. |
| 2011/0114154 A1 | 5/2011 | Lichy et al. |
| 2011/0121652 A1 | 5/2011 | Sella et al. |
| 2011/0140536 A1 | 6/2011 | Adest et al. |
| 2011/0181251 A1 | 7/2011 | Porter et al. |
| 2011/0210611 A1 | 9/2011 | Ledenev et al. |
| 2011/0254372 A1 | 10/2011 | Haines et al. |
| 2011/0267859 A1 | 11/2011 | Chapman |
| 2011/0271611 A1 | 11/2011 | Maracci et al. |
| 2011/0273015 A1 | 11/2011 | Adest et al. |
| 2011/0273016 A1 | 11/2011 | Adest et al. |
| 2011/0285205 A1 | 11/2011 | Ledenev et al. |
| 2011/0290317 A1 | 12/2011 | Naumovitz et al. |
| 2011/0291486 A1 | 12/2011 | Adest et al. |
| 2011/0316346 A1 | 12/2011 | Porter et al. |
| 2012/0032515 A1 | 2/2012 | Ledenev et al. |
| 2012/0091810 A1 | 4/2012 | Aiello et al. |

FOREIGN PATENT DOCUMENTS

| | | |
|---|---|---|
| DE | 19737286 | 3/1999 |
| DE | 102005030907 | 1/2007 |

| | | |
|---|---|---|
| DE | 102008057874 | 5/2010 |
| EP | 0419093 | 3/1991 |
| EP | 0420295 A1 | 4/1991 |
| EP | 0604777 A1 | 7/1994 |
| EP | 0756178 | 1/1997 |
| EP | 0827254 | 3/1998 |
| EP | 1330009 | 7/2003 |
| EP | 1503490 | 2/2005 |
| EP | 1531545 A2 | 5/2005 |
| EP | 1657557 | 5/2006 |
| EP | 1657797 A1 | 5/2006 |
| EP | 1887675 | 2/2008 |
| EP | 2048679 | 4/2010 |
| ES | 2249147 | 3/2006 |
| ES | 2249149 | 3/2006 |
| JP | 61065320 | 4/1986 |
| JP | 6165320 | 5/1986 |
| JP | 11041832 | 2/1999 |
| JP | 11103538 | 4/1999 |
| JP | 2003124492 | 4/2003 |
| JP | 2003-134667 A | 5/2003 |
| JP | 2007-058845 A | 3/2007 |
| WO | WO 93/13587 A1 | 7/1993 |
| WO | WO 96/13093 A1 | 5/1996 |
| WO | 9823021 | 5/1998 |
| WO | WO 98/23021 A2 | 5/1998 |
| WO | 0000839 | 1/2000 |
| WO | 0021178 | 4/2000 |
| WO | 0075947 | 12/2000 |
| WO | 0231517 | 4/2002 |
| WO | WO 03/050938 A2 | 6/2003 |
| WO | WO 03/071655 A1 | 8/2003 |
| WO | WO 2004/023278 A2 | 3/2004 |
| WO | WO 2004/090993 A2 | 10/2004 |
| WO | 2004107543 | 12/2004 |
| WO | 2005076444 | 8/2005 |
| WO | WO 2005/076445 A1 | 8/2005 |
| WO | 2006005125 | 1/2006 |
| WO | 2006007198 | 1/2006 |
| WO | WO 2006/078685 A2 | 7/2006 |
| WO | WO 2007/006564 A2 | 1/2007 |
| WO | 2007048421 | 5/2007 |
| WO | 2007073951 | 7/2007 |
| WO | WO 2007/084196 A2 | 7/2007 |
| WO | 2007090476 | 8/2007 |
| WO | WO 2007/113358 A1 | 10/2007 |
| WO | 2009051853 | 4/2009 |
| WO | 2009118682 | 10/2009 |
| WO | 2009118683 | 10/2009 |
| WO | 2009136358 | 11/2009 |
| WO | 2010065388 | 6/2010 |
| WO | 2010072717 | 7/2010 |
| WO | 2011011711 | 1/2011 |
| WO | 2011017721 | 2/2011 |

OTHER PUBLICATIONS

Alonso, R., "Experimental Results of Intelligent PV Module for Grid-Connected PV Systems," 21$^{st}$ European Photovoltaic Solar Energy Conference, Sep. 4-8, 2006, Dresden, Germany.pp. 2297-2300.

Enslin, Johan H. R., "Integrated Photovoltaic Maximum Power Point Tracking Converter," IEEE Transactions on Industrial Electronics, vol. 44, No. 6, Dec. 1997. pp. 769-773.

Nikraz, Magid, "Digital Control of a Voltage Source Inverter in Photovoltaic Applications," 2004 35$^{th}$ Annual IEEE Power Electronics Specialists Conference, Aachen, Germany, 2004. pp. 3266-3271.

Orduz, R., "Evaluation Test Results of a New Distributed MPPT Converter," 22$^{nd}$ European Photovoltaic Solar Energy Conference, Sep. 3-7, 2007, Milan, Italy.

Palma, L., "A Modular Fuel Cell, Modular DC-DC Converter Concept for High Performance and Enhanced Reliability," IEEE 2007. pp. 2633-2638.

Quaschning, Volker, "Cost Effectiveness of Shadow Tolerant Photovoltaic Systems," Berlin University of Technology, Institute of Electrical Energy Technology, Renewable Energy Section. EuroSun'96. pp. 819-824.

Roman, E., "Intelligent PV Module for Grid-Connected PV Systems," IEEE Transactions on Industrial Electronics, vol. 53, No. 4, Aug. 2006. pp. 1066-1073.

Roman, E., "Power Line Communications in Modular PV Systems," 20$^{th}$ European Photovoltaic Solar Energy Conference, Jun. 6-10, 2005, Barcelona, Spain. pp. 2249-2252.

Uriarte, S., "Energy Integrated Management System for PV Applications," 20$^{th}$ European Photovoltaic Solar Energy Conference, Jun. 6-10, 2005, Barcelona, Spain. pp. 2292-2295.

Walker, Geoffrey R., "Cascaded DC-DC Converter Connection of Photovoltaic Modules," IEEE Transactions on Power Electronics, vol. 19, No. 4, Jul. 2004. pp. 1130-1139.

International Search Report for PCT/IB2007/004610 dated Feb. 23, 2009.

International Search Report for PCT/IB2007/004584 dated Jan. 28, 2009.

International Search Report for PCT/IB2007/004586 dated Mar. 5, 2009.

International Search Report for PCT/IB2007/004643 dated Jan. 30, 2009.

International Search Report for PCT/US2008/085736 dated Jan. 28, 2009.

International Search Report for PCT/US2008/085754 dated Feb. 9, 2009.

International Search Report for PCT/US2008/085755 dated Feb. 3, 2009.

Atsushi Kajihara, et al. "Model of Photovoltaic Cell Circuits Under Partial Shading," 2005 IEEE, pp. 866-870.

Werner Knaupp, et al., "Operation of a 10 KW PV Façade with 100 W AC Photovoltaic Modules," 1996 IEEE, 25$^{th}$ PVSC, May 13-17, 1996, pp. 1235-1238, Washington, D.C.

O. Alonso, et al., "Cascaded H-Bridge Multilevel Converter for Grid Connected Photovoltaic Generators with Independent Maximum Power Point Tracking of Each Solar Array," 2003 IEEE 34$^{th}$, Annual Power Electronics Specialists Conference, Acapulco, Mexico, Jun. 15-19, 2003, pp. 731-735, vol. 2.

J.M.A. Myrzik, et al., "String and Module Integrated Inverters for Single-Phase Grid Connected Photovoltaic Systems—A Review," Power Tech Conference Proceedings, 2003 IEEE Bologna, Jun. 23-26, 2003 p. 8, vol. 2.

Jingquan Chen, et al., "Predictive Digital Current Programmed Control," IEEE Transactions on Power Electronics, vol. 18, Issue 1, Jan. 2003.

K. Wallace, et al, "DSP Controlled Buck/Boost Power Factor Correction for Telephony Rectifiers," Telecommunications Energy Conference, 2001. INTELEC 2001. Twenty-Third International, Oct. 18, 2001, pp. 132-138.

Ciobotaru, et al., Control of single-stage single-phase PV inverter, Aug. 7, 2006.

International Search Report and Written Opinion for PCT/IB2007/004591 dated Jul. 5, 2010.

European Communication for EP07873361.5 dated Jul. 12, 2010.
European Communication for EP07874022.2 dated Oct. 18, 2010.
European Communication for EP07875148.4 dated Oct. 18, 2010.

Chen, et al., "A New Low-Stress Buck-Boost Converter for Universal-Input PFC Applications", IEEE Applied Power Electronics Converence, Feb. 2001, Colorado Power Electronics Center Publications.

Chen, et al., "Buck-Boost PWM Converters Having Two Independently Controlled Switches", IEEE Power Electronics Specialists Converence, Jun. 2001, Colorado Power Electronics Center Publications.

Esram, et al., "Comparison of Photovoltaic Array Maximum Power Point Tracking Techniques", IEEE Transactions on Energy Conversion, vol. 22, No. 2, Jun. 2007, pp. 439-449.

Walker, et al., "PhotoVoltaic DC-DC Module Integrated Converter for Novel Cascaded and Bypass Grid Connection Topologies-Design and Optimisation", 37th IEEE Power Electronics Specialists Converence, Jun. 18-22, 2006, Jeju, Korea.

Geoffrey R. Walker Affidavit re: U.S. Appl. No. 11/950,307.
Geoffrey R. Walker Affidavit re: U.S. Appl. No. 11/950,271.

Matsui, et al. "A New Maximum Photovoltaic Power Tracking Control Scheme Based on Power Equilibrium at DC Link", IEEE, 1999, pp. 804-809.
International Preliminary Report on Patentability for PCT/IB2008/055092 dated Jun. 8, 2010.
International Search Report for PCT/IB2008/055092 dated Sep. 8, 2009.
International Search Report and Opinion of International Patent Application WO2009136358 (PCT/IB2009/051831), dated Sep. 16, 2009.
UK Intellectual Property office, Combined Search and Examination Report for GB1100450.4 under Sections 17 and 18 (3), Jul. 14, 2011.
Jain, et al., "A Single-Stage Grid Connected Inverter Topology for Solar PV Systems with Maximum Power Point Tracking", IEEE Transactions on Power Electronics, vol. 22, No. 5, Sep. 2007, pp. 1928-1940.
Lynch, et al., "Flexible DER Utility Interface System: Final Report", Sep. 2004-May 2006, Northern Power Systems, Inc., Waitsfield, Vermont B. Kroposki, et al., National Renewable Energy Laboratory Golden, Colorado Technical Report NREL/TP-560-39876, Aug. 2006.
Schimpf, et al., "Grid Connected Converters for Photovoltaic, State of the Art, Ideas for improvement of Transformerless Inverters", NORPIE/2008, Nordic Workshop on Power and Industrial Electronics, Jun. 9-11, 2008.
Sandia Report SAND96-2797 I UC-1290 Unlimited Release, Printed Dec. 1996, "Photovoltaic Power Systems and The National Electrical Code: Suggested Practices", by John Wiles, Southwest Technology Development Instutte New Mexico State University Las Cruces, NM.
United Kingdom Intellectual Property Office, Combined Search and Examination Report Under Sections 17 and 18(3), GB1020862.7, dated Jun. 16, 2011.
QT Technical Application Papers, "ABB Circuit-Breakers for Direct current Applications", ABB SACE S.p.A., An ABB Group Coupany, L.V. Breakers, Via Baioni, 35, 24123 Bergamo-Italy, Tel.: +39 035.395.111—Telefax: +39 035.395.306-433.
Woyte, et al., "Mains Monitoring and Protection in a European Context", 17th European Photovoltaic Solar Energy Conference and Exhibition, Munich, Germany, Oct. 22-26, 2001, ACHIM, WOYTE, et al., pp. 1-4.
"Implementation and testing of Anti-Islanding Algorithms for IEEE 929-2000 Compliance of Single Phase Photovoltaic Inverters", Raymond M. Hudson, Photovoltaic Specialists Conference, 2002. Conference Record of the Twenty-Ninth IEEE, May 19-24, 2002.
Fairchild Semiconductor, Application Note 9016, IGBT Basics 1, by K.S. OH Feb. 1, 2001.
"Disconnect Switches in Photovoltaic Applications", ABB, Inc., Low Voltage Control Products & Systems, 1206 Hatton Road, Wichita Falls, TX 86302, Phone 888-385-1221, 940-397-7000, Fax: 940-397-7085, 1SXU301197B0201, Nov. 2009.
Walker, "A DC Circuit Breaker for an Electric Vehicle Battery Pack", Australasian Universities Power Engineering Conference and IEAust Electric Energy Conference, Sep. 26-29, 1999.
Combined Search and Examination Report for GB1018872.0 dated Apr. 15, 2011, 2 pages.
International Search Report and Opinion of International Patent Application PCT/2009/051221, dated Oct. 19, 2009.
International Search Report and Opinion of International Patent Application PCT/2009/051222, dated Oct. 7, 2009.
Communication in EP07874025.5 dated Aug. 17, 2011.
IPRP for PCT/IB2008/055095 dated Jun. 8, 2010, with Written Opinion.
ISR for PCT/IB2008/055095 dated Apr. 30, 2009.
IPRP for PCT/IL2007/001064 dated Mar. 17, 2009, with Written Opinion dated Mar. 25, 2008.
ISR for PCT/IL07/01064 dated Mar. 25, 2008.
IPRP for PCT/IB2007/004584 dated Jun. 10, 2009, with Written Opinion.
IPRP for PCT/IB2007/004586 dated Jun. 10, 2009, with Written Opinion.
IPRP for PCT/IB2007/004591 dated Jul. 13, 2010, with Written Opinion.

IPRP for PCT/IB2007/004610 dated Jun. 10, 2009, with Written Opinion.
IPRP for PCT/IB2007/004643 dated Jun. 10, 2009, with Written Opinion.
Written Opinion for PCT/IB2008/055092 submitted with IPRP dated Jun. 8, 2010.
IPRP for PCT/US2008/085754 dated Jun. 8, 2010, with Written Opinion dated Jan. 21, 2009.
IPRP for PCT/US2008/085755 dated Jun. 8, 2010, with Written Opinion dated Jan. 20, 2009.
IPRP for PCT/IB2009/051221 dated Sep. 28, 2010, with Written Opinion.
IPRP for PCT/IB2009/051222 dated Sep. 28, 2010, with Written Opinion.
IPRP for PCT/IB2009/051831 dated Nov. 9, 2010, with Written Opinion.
IPRP for PCT/US2008/085736 dated Jun. 7, 2011, with Written Opinion.
IPRP for PCT/IB2010/052287 dated Nov. 22, 2011, with Written Opinion.
ISR for PCT/IB2010/052413 dated Sep. 7, 2010.
UK Intellectual Property Office, Application No. GB1109618.7, Patents Act 1977, Examination Report Under Section 18(3), Sep. 16, 2011.
UK Intellectual Property Office, Patents Act 1977: Patents Rules Notification of Grant: Patent Serial No. GB2480015, Nov. 29, 2011.
Walker, et al. "PV String Per-<odule Maximim Power Point Enabling Converters", School of Information Technology and Electrical Engineering the Univiversity of Queensland, Sep. 28, 2003.
Walker, "Cascaded DC-DC Converter Connection of Photovoltaic Modules", 33rd Annual IEEE Power Electronics Specialists Conference. PESC 2002. Conference Proceedings. CAIRNS, Queensland, Australia, Jun. 23-27, 2002; [Annual Power Electronics Specialists Conference], New York, NY: IEEE US, vol. 1, Jun. 23, 2002, pp. 24-29, XP010596060 ISBN: 978-0-7803-7262-7, figure 1.
Baggio, "Quasi-ZVS Activity Auxiliary Commutation Circuit for Two Switches Forward Converter", 32nd Annual IEEE Power Electronics Specialists Conference. PESC 2001. Conference Proceedings. Vancouver, Canada, Jun. 17-21, 2001; [Annual Power Electronics Specialists Conference] New York, NY: IEEE, US.
Ilic, "Interleaved Zero-Current-Transition Buck Converter", IEEE Transactions on Industry Applications, IEEE Service Center, Piscataway, NJ, US, vol. 43, No. 6, Nov. 1, 2007, pp. 1619-1627, XP011197477 ISSN: 0093-9994, pp. 1619-1922.
Lee: "Novel Zero-Voltage-Transition and Zero-Current-Transition Pulse-Width-Modulation Converters", Power Electronics Specialists Conference, 1997, PESC '97, Record, 28th Annual IEEE St. Louis, MO, USA, Jun. 22-27, 1997, New York, NY, USA IEEE, US, vol. 1, Jun. 22, 1997, pp. 233-239, XP010241553, ISBN: 978-0-7803-3840-1, pp. 233-236.
Sakamoto, "Switched Snubber for High-Frequency Switching Converters", Electronics & Communications in Japan, Part 1—Communications, Wiley, Hoboken, NJ, US, vol. 76, No. 2, Feb. 1, 1993, pp. 30-38, XP000403018 ISSN: 8756-6621, pp. 30-35.
Duarte, "A Family of ZVX-PWM Active-Clamping DC-to-DC Converters: Synthesis, Analysis and Experimentation", Telecommunications Energy Conference, 1995, INTELEC '95, 17th International The Hague, Netherlands, Oct. 29-Nov. 1, 1995, New York, NY, US, IEEE, US, Oct. 29, 1995, pp. 502-509, XP010161283 ISBN: 978-0-7803-2750-4 p. 503-504.
Lijun Gao et al., Parallel-Connected Solar PV System to Address Partial and Rapidly Fluctuating Shadow Conditions, IEEE Transactions on industrial Electronics, vol. 56, No. 5, May 2009.
Hou, et al., Application of Adaptive Algorithm of Solar Cell Battery Charger, Apr. 2004.
Stamenic, et al., "Maximum Power Point Tracking for Building Integrated Photovoltaic Ventilation Systems", 2000.
Informal Comments to the International Search Report dated Dec. 3, 2009.
PCT/IB2010/052287 International Search Report and Written Opinion dated Sep. 2, 2010.

* cited by examiner

BATTERY POWER DELIVERY MODULE

CROSS-REFERENCE TO RELATED APPLICATIONS

This Application claims priority to U.S. Provisional Patent Applications, Ser. No. 60/868,851, filed Dec. 6, 2006, and titled "Distributed Solar Array Monitoring, Management and Maintenance," Ser. No. 60/868,893, filed Dec. 6, 2006, and titled "Distributed Power Harvesting System for Distributed Power Sources," 60/868,962, filed Dec. 7, 2006, and titled "System, Method and Apparatus for Chemically Independent Battery," Ser. No. 60/908,095, filed Mar. 26, 2007, and titled "System and Method for Power Harvesting from Distributed Power Sources," and Ser. No. 60/916,815, filed May 9, 2007, and titled "Harvesting Power From Direct Current Power Sources," the entire content of which is incorporated herein by reference. Further, this Application is related to ordinary U.S. patent application Ser. No. 11/950,224, filed Dec. 4, 2007, titled "Current Bypass for Distributed Power Harvesting Systems Using DC Power Sources," patent application Ser. No. 11/950,271, filed Dec. 4, 2007, titled "Distributed Power Harvesting Systems Using DC Power Sources," patent application Ser. No. 11/950,307, filed Dec. 4, 2007 titled "A Method for Distributed Power Harvesting Using DC Power Sources," patent application Ser. No. 11/951,419, filed Dec. 6, 2007, titled "Monitoring of Distributed Power Harvesting Systems Using DC Power Sources," and patent application Ser. No. 11/951,485, filed Dec. 6, 2007, titled "Removal Component Cartridge for Increasing Reliability in Power Harvesting Systems," and incorporates the entire content of these applications by this reference.

BACKGROUND

1. Field of the Invention

The present invention relates generally to power management, power conversion and batteries and, more particularly, to power conversion for batteries.

2. Related Arts

Most of the electronic devices today are configured for specific battery types and chemistries. The selection of which chemistry to use is usually based upon an assessment of, among other considerations, the device's environmental conditions and expected lifetime, and the price of the battery at time of design.

Different batteries have different chemistries, each having their own properties, advantages and challenges. One conventional type of battery, that is used extensively especially in lower-end products, uses a Nickel-Cadmium (Ni—Cd) chemistry. A Ni—Cd battery has numerous drawbacks and limitations: it allows only moderate energy density (45-80 Wh/Kg); has a high rate of self-discharge of approximately 20% per month; and requires charging maintenance in the form of periodic charge/discharge cycles in order to prevent memory-effects which limit the usable capacity of the battery. Furthermore, the compounds used in its production are highly toxic and cause environmental problems. Cells of this chemistry have an output voltage of approximately 1.25 volts. The Nickel-Metal-Hydride (NiMH) chemistry is a variation of Ni-Cad and shares many of the Ni-Cad properties. It provides a slightly higher energy density 60-120 Wh/Kg.

In the recent years, Lithium-ion (Li-ion) batteries have become prevalent, especially in devices which require high energy densities such as laptops, medical devices and cell-phones. This chemistry provides high energy density (150-190 Wh/Kg) and is environmentally friendly. However, it also suffers from numerous drawbacks. It has a limited life and after 300-500 cycles the battery's capacity drops to 80% of the rated capacity. It has very low tolerance to overcharging, and if mistreated might become thermally unstable and hazardous. In order to maintain the battery's safety, it is essential to have charge/discharge monitoring and protection circuits that prevent over-discharge, monitor the charging process and stop the charging before over-charge. Cells of this chemistry have a maximum output voltage of approximately 4.1V but will provide efficient power at approximately 3.6V, and their voltage shouldn't drop under 2.5V-3V, depending on the kind of Li-ion used.

There is continuous progress in increasing the capacity of different types of the Li-ion chemistry and new battery technologies, such as spinnel and Li-Polymer, keep emerging. These technologies, while similar to the regular Li-ion technology, may require adaptation of the hosting devices due to slightly different voltages or charge procedures.

Finally, there are radically new battery technologies in the making, such as nano-tube based batteries, which hold the promise of much higher charge capacities. However, because these batteries will have electronic properties different from the currently common batteries, the current electronic products would need an adaptation circuit in order to benefit from such batteries.

As set forth above, most electronic devices are configured for a specific battery type. Locking the design of an electronic device into one specific battery type prevents the device owners from enjoying the benefits of new battery technologies, price reductions and other advances. In order to enjoy such benefits, the device must be re-designed in order to fit the new batteries. This is not desirable for the buyer.

Furthermore, if problems are found in the battery management circuits, a recall may have to be made in order to fix the problem. Recalls, that happen not infrequently, are costly to the device manufacturer.

Energy efficiency in analog conversion circuits is greatly dependant upon the current consumption. The conversion efficiency will usually be high for the designed load and current consumption, but as the load changes the efficiency drops. Thus, if good energy efficiency is desired, the conversion circuit must be specifically designed for the host device. Building a voltage-converting circuit to fit many different products and, thus, many different loads, is complicated and results in a large converter that is not suitable for a small battery.

SUMMARY

The following summary of the invention is included to provide a basic understanding of some aspects and features of the invention. This summary is not an extensive overview of the invention, and as such it is not intended to particularly identify key or critical elements of the invention, or to delineate the scope of the invention. Its sole purpose is to present some concepts of the invention in a simplified form as a prelude to the more detailed description that is presented below.

Aspects of the invention provide circuitry that may be incorporated in the battery itself or outside of the battery. The circuitry is programmed to output the voltage required by the load, and monitors the power drawn from the battery according to the battery's characteristics, e.g., type, temperature, age, shelf life, etc.

According to an aspect of the invention, an intelligent battery power delivery apparatus is provided, comprising: input terminals receiving power from one or more battery cells; output terminal for providing power to a load; and, a conversion module programmable to maintain output power characteristics at the output terminals according to programmed characteristics, and programmable to control power draw at the input terminals according to programmed characteristics. The conversion module may comprise an integrated circuit. The conversion module may comprise a DC/DC converter. The conversion module may comprise a buck converter and a boost converter and wherein one of the buck converter and the boost converter is engaged depending on the type of the battery cell. The conversion module may further comprise a battery protection unit. The battery protection unit may comprise a fuel gauging unit for monitoring the state of charge of the one or more battery cells. The conversion module may further comprise a current sensor. The conversion module may further comprise telemetry terminals for communicating operation data. The apparatus may further comprise a casing, and wherein the conversion module and the one or more battery cells are housed within the casing and form an integral intelligent battery. The conversion module may comprise a digital circuit, the digital circuit comprising: a DC to DC voltage conversion unit; a current sense unit; a fuel gauge; and a central processing unit; wherein the DC to DC voltage conversion unit is adapted to provide a desirable voltage to the load, wherein the current sense unit is adapted to obtain a sensed current from the battery module and to utilize the sensed current for functioning of the fuel gauge unit, wherein the fuel gauge unit monitors a state of charge of the one or more battery cells and reports the state of charge to the central processing unit to prevent overcharge or over-discharge of the one or more battery cells, and wherein the central processing unit manages the digital power conversion. The conversion unit may comprise: a charge/discharge unit; a battery protection unit; and an internal DC regulation unit, wherein the charge/discharge unit is adapted to provide over-current protection during discharge and to control charging schemes used by the intelligent battery, wherein the battery protection unit is adapted to monitor voltage, the sensed current and battery module charge and to alert the central processing unit of potentially hazardous conditions, and wherein the internal voltage regulation unit regulates a voltage required by each of the power management and conversion units. The conversion module may further comprise telemetry terminals for communicating with an outside device, and wherein the central processing unit communicates with the outside device via the telemetry port.

According to aspects of the invention, an intelligent battery is provided, comprising: a casing; one or more battery cells housed within the casing; and a conversion circuit housed within the casing, the conversion circuit adapted to perform digital power conversion; wherein the conversion circuit controls a voltage conversion to convert a voltage of the battery cells to a voltage level corresponding to load requirement, and wherein the conversion circuit controls a charging of the battery cells to provide an external DC voltage to the battery cells according to charging requirements of the battery cells. The conversion circuit may further comprise programming means enabling the conversion circuit to provide output power characteristic of at least one of an alkaline battery, a lithium ion battery, a metal hydride battery, a Nickel-Cadmium battery, and a Nickel-Metal-Hydride battery, regardless of the type of one or more battery cells housed within the casing. The conversion circuit may comprise a digital integrated circuit. The conversion circuit may comprise a charge/discharge unit; a battery protection unit; and an internal DC regulation unit.

According to aspects of the invention, a method for utilizing a first type battery in an application designed for a second type battery is provided, the method comprising: converting a first power from the first type battery to a second power corresponding to the second type battery using digital power conversion; and converting a charging voltage from a charger corresponding to the second type battery to a charging voltage appropriate for the first type battery. The converting a first power may comprise digitally converting the first power. The method may further comprise monitoring charging voltage applied to the first battery type to protect from overcharging and under charging. The method may further comprise tracking battery status by monitoring charge condition in the first battery type.

BRIEF DESCRIPTION OF THE DRAWINGS

The accompanying drawings, which are incorporated in and constitute a part of this specification, exemplify the embodiments of the present invention and, together with the description, serve to explain and illustrate principles of the invention. The drawings are intended to illustrate major features of the exemplary embodiments in a diagrammatic manner. The drawings are not intended to depict every feature of actual embodiments nor relative dimensions of the depicted elements, and are not drawn to scale.

DETAILED DESCRIPTION

Aspects of the present invention are directed to an intelligent battery including one or more battery cells together with digital power management and conversion electronics. The intelligent battery provides a substantially constant voltage required by the hosting device and manages the charge/discharge operations. As a result, the hosting device may be simplified and different battery chemistries may be made compatible with a particular hosting device.

In one aspect of the invention, a single package is provided, which includes both battery cell or cells and a power management integrated circuit (IC). In one aspect of the invention, the package includes two separate modules, one including the battery cells and the other including the power management IC such that the battery cells may be replaced. The power management IC that is used may be included in the host device, thus enabling the host device to use different battery cells. In one aspect, a safety circuit monitors the battery to prevent misuse and a charge circuit correctly charges the battery in an adequate manner. Fuel-gauging may be used to provide data about the state-of-charge of the battery and monitoring may be used to provide data about the state-of-health of the battery. The battery cells used in various aspects of the invention may include chemical battery cells, fuel-cells, photovoltaic cells and the like.

Aspects of the invention also provide a method for utilizing a first type of battery in an application and a circuit that is designed for a second type of battery. A power conversion scheme is used to convert the power output from the first type of battery to the power that would be output from the second type of battery. The power conversion scheme may be implemented digitally, due to its greater versatility and higher efficiencies over large load variations. Also, when a charger corresponding to the second type of battery is being used to charge the first type of battery, the charging voltage is adjusted by the digital power conversion scheme to a level appropriate for charging the first battery. Digital power conversion schemes are used because they maintain a more uniform efficiency over a wider range of loads when compared to analog power conversion schemes that are efficient only near their design load.

Figure 1:
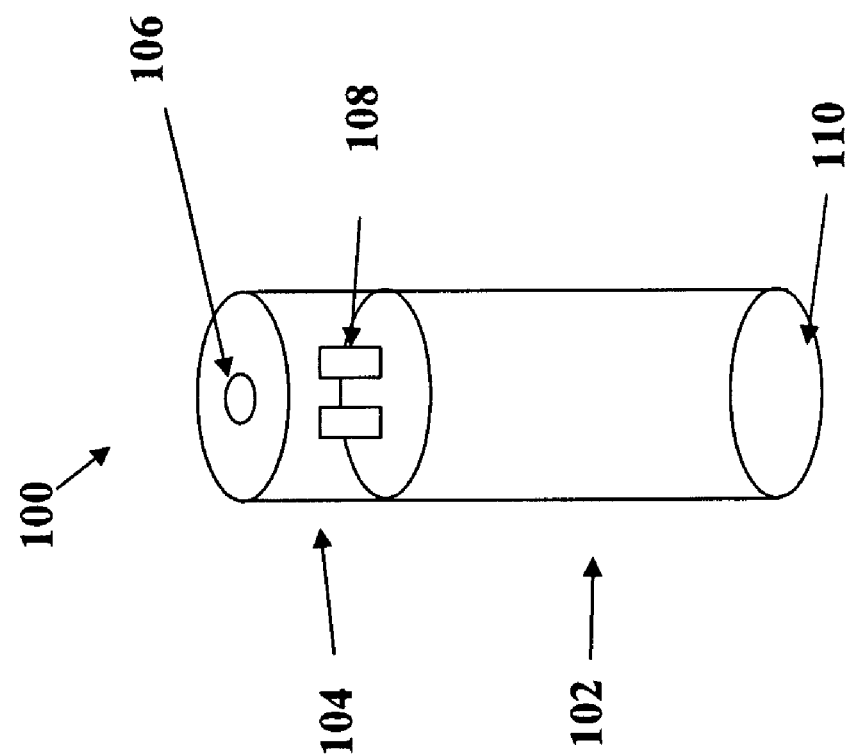
FIG. 1 shows an integral intelligent battery according to aspects of the invention.

FIG. 1 shows an integral intelligent power-converting battery 100, according to aspects of the invention. The battery 100 shown in FIG. 1 includes one or more battery cells 102 and a power management and conversion unit 104 that are encased in the same casing. The battery 100 also includes an anode terminal 106 and debug, telemetry and upgrade terminals 108 at the power management and conversion unit 104, and a cathode terminal 110 at the one or more battery cells 102. The debug and telemetry terminals 108 are optional.

The casing interfaces to external components and a host device via the anode 106 and the cathode 110 terminals. Through the anode and the cathode terminals 106, 110, energy from the battery may be supplied to a hosting device and external voltage may be applied to the battery in order to charge the battery.

The power management and conversion unit 104 may provide the power conversion, battery charge/discharge and communication functionality. The power management and conversion unit 104 may be implemented in a PCB with discrete components soldered to it. Alternatively, the power management and conversion unit 104 may be implemented in a single component IC.

The power management and conversion unit 104 controls the power delivered to the load and the power extracted from the batteries. As for the power delivery to the load, unit 104 may be programmed with the parameters of the load, e.g., voltage and current requirements. The programming can be done beforehand in the factory, and may also be done by user programming or by "learning" the requirements from interaction with the load. As for power extracted from the battery, here too unit 104 may be programmed in the factory for a certain type of cell, but may have means for modifying this programming or for programming in the field by user or by "learning" the cell's characteristics. For example, unit 104 could learn what battery-cell it is coupled to based on sensing the output voltage, performing short-circuit for a very short time to determine the maximum current, see how long it takes to drain to gather capacity, etc. Using this information unit 104 provides the required output power to the load, but extracts power according to the requirements of the battery or cells. In this manner, any type of battery may be connected to any type of device.

The optional debug and telemetry terminals 108 are used for ascertaining status information about the intelligent battery or for providing the intelligent battery with operating instructions. Status information about the intelligent battery may be the state of charge (SoC) of the enclosed cell 102, state of health (SoH), internal temperature, and various statistics regarding the cell 102 that may be logged in the power management and conversion unit 104. This statistics include date of production, number of charge cycles to date, type of cells, cell output voltage, and regulated output voltage. Operating instructions to the intelligent battery may include requests for wanted regulator output voltage, current and voltage limiting, and various charge parameters. The charge parameters include the charging scheme parameters, amount of charge parameters and safety parameters. The charging schemes include constant current, constant voltage, trickle, and the like. The amount of charge parameters include the maximal and the minimal charge allowed. The safety parameters include the maximum allowed temperature.

Communications to and from the debug and telemetry terminals 108 may be implemented by various protocols. In one aspect of the invention, an asynchronous serial communication bus may be used, in other embodiments synchronous communications may be used such as SPI or I2C. Other protocols such as PMBus or SMBus may be used. Both point-to-point and bus topologies may be suitable for this type of communication. The communication may be wireless, either in active form by use of IR or RF transceivers, or in passive form by use of RFID or similar devices.

Figure 2:
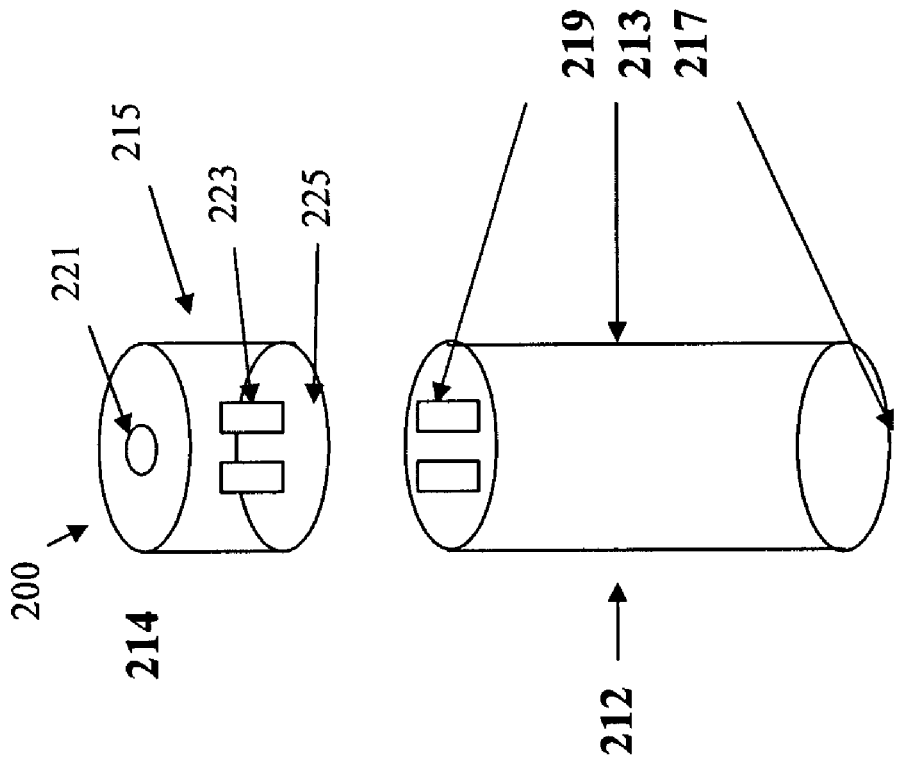
FIG. 2 shows a modular intelligent battery according to aspects of the invention.

FIG. 2 shows a modular intelligent power-converting battery according to aspects of the invention. The modular intelligent battery 200 includes two separate and connectable modules. A battery module 212 that includes the battery cells 213 and a conversion module 214 that includes a power management and conversion unit 215. In the modular intelligent battery 200 shown in FIG. 2, replacement of the battery cell or battery cells 213 is possible.

The battery module 212 includes an external battery cathode 217 and terminals 219 to the conversion module 214. The conversion module 214 includes an external battery anode 221, optional debug, telemetry and upgrade terminals 223 and terminals 225 to the battery module 212. The battery module 212 and the conversion module 214 may be connected through the terminals 219 and 225. The conversion module 214 may operate as unit 104 to ensure proper power output and proper power extraction from the battery module 212.

The conversion module may be implemented as application specific module or a generic module. When it is designed as application specific module, it is designed for a specific type of battery and a specific type of load. In such a case, its input and output power requirements are preprogrammed at the factory for the specific battery and specific load. On the other hand, if it is made as a generic module, means for programming different input and output power characteristics are provided, so that the conversion module 214 may be connected to any type of load and be used with any type of battery. Various methods for programming the required output and input may be implemented. For example, the unit may be coupled to a computer via a charger, USB, etc., and the required programming downloaded via the Internet. Also, means may be provided for a user to input a code when the battery type or load is changed.

In the modular intelligent battery 200, the battery cells 212 may be replaced when they malfunction or reach the end of their life. The modular intelligent battery 200, however, may require a larger casing or may be less reliable than the integral intelligent battery 100 of FIG. 1.

Figure 3:
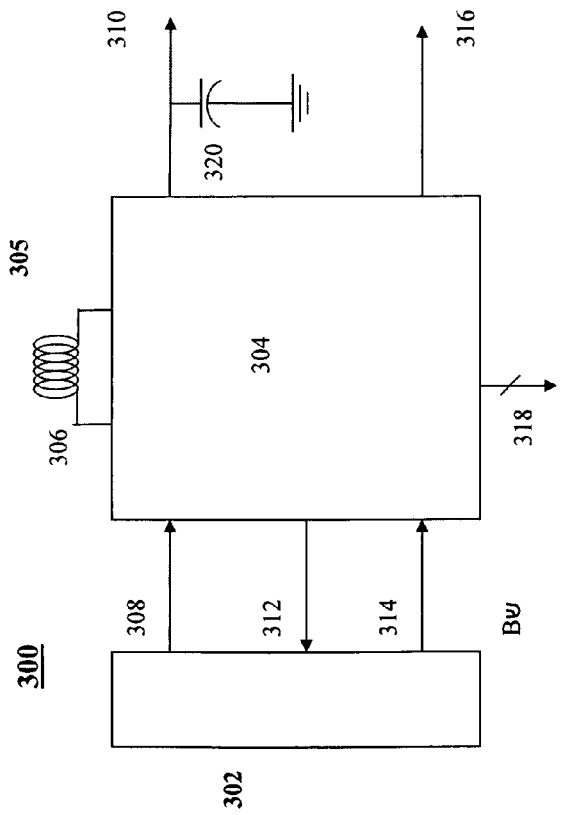
FIG. 3 is a block diagram of components of an intelligent battery according to aspects of the invention.

FIG. 3 is a block diagram of components of an intelligent battery according to aspects of the invention. FIG. 3 shows the coupling between a battery module 302 including one or more battery cells and a power management and conversion module 305 in an intelligent battery 300. The two modules 302, 305 are coupled via voltage input terminals 308, 314. The voltage input terminals 308, 314 are respectively providing a battery Vcc and a battery ground. The battery module 302 and the conversion module 305 may also be connected by one or more sensors 312. These sensors may be temperature or pressure sensors but they may be any other sensor deemed appropriate.

Voltage output terminals 310 and 316 are provided at the conversion module 305 and may also be used for charging the battery module 302. Optionally, a debug and telemetry terminal 318 may be present to provide the functionality discussed above.

In one aspect of the invention, the conversion module 305 includes an IC 304 and external components. In FIG. 3, the external components are respectively an inductor 306 and a capacitor 320. The integration of the elements into the IC 304 provides digital power conversion and permits the conversion module 305 to include fewer external components.

Figure 4:
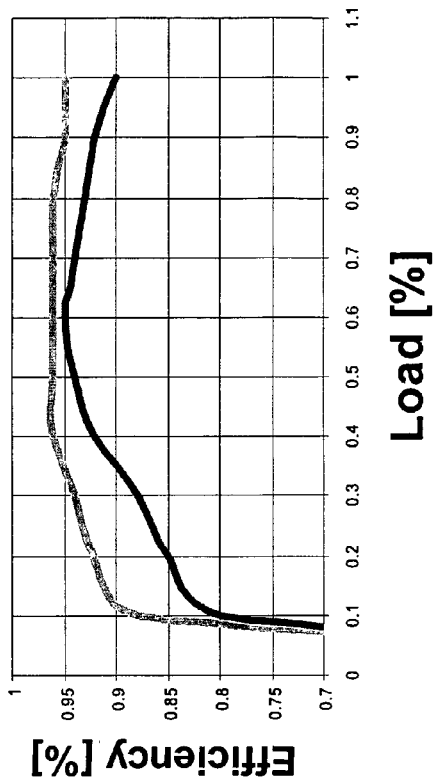
FIG. 4 is a plot of conversion efficiency versus load and shows a comparison between conversion efficiency of an analog conversion scheme and a digital conversion scheme.

FIG. 4 is a plot of conversion efficiency versus load and shows a comparison between conversion efficiency of an analog conversion scheme and a digital conversion scheme. In FIG. 4, a load being supplied by a battery through a conversion module is shown on the horizontal axis and the percent efficiency of the conversion is shown on the vertical axis. A load for which an analog conversion circuit is designed is shown at 402. An efficiency curve 404 using an analog conversion and another efficiency curve 406 using a digital conversion are superimposed.

Analog power conversion schemes usually imply a linear control algorithm. These linear loops take a relatively long time to adapt to changes in current consumption by the load or the host. Thus, if the host suddenly starts to take more current, while the loop is adjusting, the voltage may drop. Large external capacitors and inductors are used to prevent the drop and maintain the required voltage until the loop adjusts. When digital conversion is used, the loop feedback may not be linear. As a result the convergence time may be much faster. Thus, smaller components may be used. This could be beneficial in mobile applications that require batteries.

As described above, and as depicted in FIG. 4, the analog conversion circuitry is usually designed for a specific load such as the load 402. At this load, the analog conversion is quite efficient and the efficiency is shown at 95%. However, efficiency of the analog conversion 404 drops at loads far from the design target load 402. As a result, it is difficult to design an efficient conversion circuit when the host device is unknown.

On the contrary, when digital power conversion schemes are used, efficient conversion could be achieved for a wider array of load conditions. As seen in FIG. 4, the efficiency curve 406 for digital conversion stays near and above 95% efficiency over a large range of loads. Therefore, an intelligent battery using digital power conversion is suitable for many different applications. The digital power conversion circuits are managed by a CPU such as a CPU 514 shown in FIG. 5.

Figure 5:
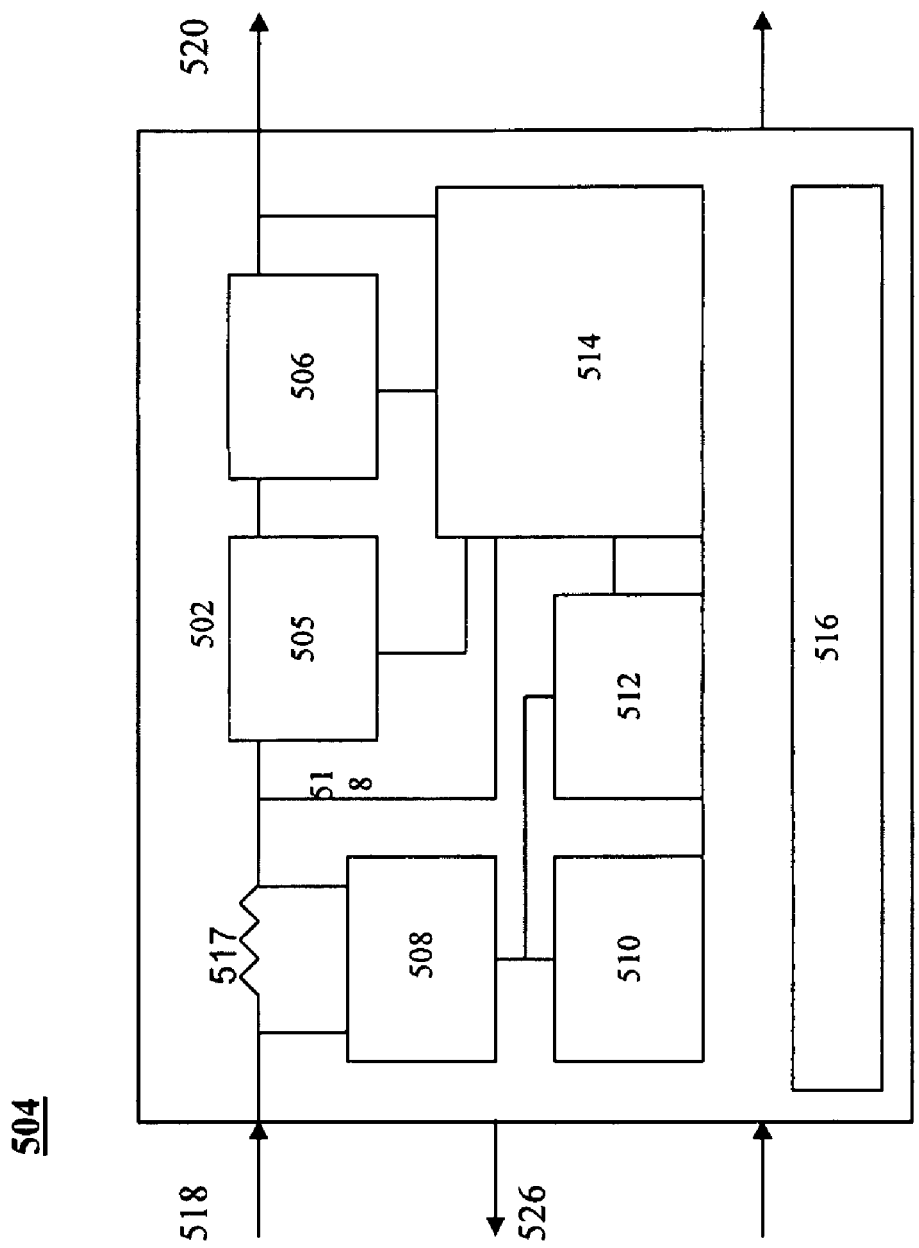
FIG. 5 is a block diagram of a power management and conversion module used in an intelligent battery according to aspects of the invention.

FIG. 5 is a block diagram of a power management and conversion module used in an intelligent battery according to aspects of the invention. FIG. 5 shows internal units in an exemplary IC 504 of a power management and conversion module according to aspects of the invention. The IC 504 includes a charge/discharge unit 505, a DC to DC conversion unit 506, a current sense unit 508, a battery protection unit 510, a fuel gauge 512, the CPU 514, and an internal DC regulation unit 516. The IC 504 engages in digital power management and conversion and therefore may operate over a large range of loads with substantially high efficiency.

The charge/discharge unit 505 is provided to prevent a load or a host device from extracting too much energy from the battery cells during discharge and to provide over-current protection. The charge/discharge unit 505 also disconnects the battery cells when they are empty in order to prevent over-discharge. During charge, the unit 505 controls the charging schemes used. Such schemes may be constant charge ratio, constant current, constant voltage and trickle charge. Because the charging of the battery cells may be software controllable, other schemes may also be implemented.

The DC to DC voltage conversion unit 506 is included to provide the host device with the desired voltage. The conversion unit 506 may be a buck, boost, buck/boost or Cuk converter. The conversion may be done substantially inside the IC 504 with field effect transistors (FETs) and drivers fabricated on the silicon substrate and only minimal external components such as an inductor and a capacitor may be used in addition to the circuits existing on the IC 504. The use of buck-boost or cascaded buck boost may be useful where the cell output voltage may drop below the desired output voltage. For example, if a Li-ion cell is used and a 3.3V output voltage is desired, because fully charged Li-ion cells provide 3.6V to 4.1V, a buck conversion is needed when the battery is fully charged. The buck conversion provides a step down conversion from 3.6V or 4.1V to the desirable 3.3V output voltage. However, Li-ion cells may drop to 2.5V and to fully utilize the charge contained in these cells, a boost conversion is performed to raise the output voltage.

The battery protection unit 510 is included such that proper charge and discharge conditions are applied. Monitoring of cell parameters such as temperature or pressure may be achieved via connection 526 to cell sensors located in a battery module such as the battery module 302 of FIG. 3. Other critical data such as voltage, current and charge is obtained from the internal units within the IC 504. If the protection unit 510 finds a potentially hazardous situation it may alert the CPU 514. The CPU may take action to minimize the risk and it may also alert the host device via the telemetry terminals.

The fuel gauging unit 512 may be present to monitor the state of charge of the battery cell. This information is reported to the CPU 514 and may be transferred to the host device. This information may also be used to prevent overcharge or over-discharge of the cell. Both overcharge and over-discharge conditions may prove dangerous to certain cell chemistries.

The current sense unit 508 is used to sense the current. The sensed current is used for the functioning of both the protection unit 510 and the fuel gauge unit 512. This current sensing may be done by monitoring the voltage drop across a sense resistor such as a resistor 517 shown in FIG. 5. Current sensing may be achieved by using a current loop, or by using other methods. The current sense unit 508 may be shared by both the battery protection unit 510 and the fuel gauge unit 512, thus lowering costs and reducing board space.

The CPU 514 is used for digital power conversion management. The CPU 514 may be implemented via a microprocessor, for ease of development, or via a state-machine, which may provide lower current consumption. The CPU 514 monitors various parameters, such as an input voltage 518 and an output voltage 520 to the IC 504, and controls the various internal units of the IC 504 that are described above. The CPU 514 also may communicate with outside devices via the debug and telemetry port.

The internal voltage regulation unit 516 regulates the voltage required by each of the other internal units. The internal voltage regulation unit 516 may receive voltage from the battery cells, and may also receive voltage from the host device in case the cells are exhausted and need to be charged.

One exemplary aspect of the present invention may be embodied in an intelligent battery casing that looks like a regular AA battery, in a manner similar to the battery depicted in FIG. 1. This battery has an internal Li-ion cell, which provides energy density greater than the energy density of Ni—Cd or Ni-MH batteries. However, the cell provides an output voltage of 3.6V instead of 1.5V, and requires different charge schemes. Part of the casing includes a small power management and conversion circuit. This circuit contains an IC and a few external components. The IC converts the voltage of the cell from 3.6V to 1.5V so it would seem like a regular Alkaline or Ni—Cd battery to any device that takes AA batteries. Providing an external DC voltage to the intelligent battery would cause the enclosed circuit to charge the cell in a manner favorable to Li-ion. This voltage could originate from a Ni—Cd charger, a dedicated intelligent battery charger, or a simple voltage source, for example, USB port of a computer. The described intelligent battery provides the advantages of a Li-ion battery to devices that were designed for Ni—Cd AA batteries. Obviously, this conversion may prove beneficial for other devices and batteries as well.

The present invention has been described in relation to particular examples, which are intended in all respects to be illustrative rather than restrictive. Those skilled in the art will appreciate that many different combinations of hardware, software, and firmware will be suitable for practicing the present invention. Moreover, other implementations of the invention will be apparent to those skilled in the art from consideration of the specification and practice of the invention disclosed herein. It is intended that the specification and examples be considered as exemplary only, with a true scope and spirit of the invention being indicated by the following claims and their equivalents.

What is claimed is:

1. An intelligent battery power delivery apparatus, comprising:
    input terminals receiving power from one or more battery cells;
    output terminals for providing power to a load; and,
    a conversion module configured to maintain output power characteristics at the output terminals according to programmed characteristics, and configured to control power draw at the input terminals according to the programmed characteristics;
    wherein the conversion module comprises a digital circuit, the digital circuit comprising:
    a DC to DC voltage conversion unit;
    a current sense unit;
    a fuel gauge; and
    a central processing unit;
    wherein the DC to DC voltage conversion unit is adapted to provide a programmed voltage to the load,
    wherein the current sense unit is adapted to obtain a sensed current from the one or more battery cells and to utilize the sensed current for functioning of the fuel gauge unit,
    wherein the fuel gauge unit monitors a state of charge of the one or more battery cells and reports the state of charge to the central processing unit to prevent overcharge or over-discharge of the one or more battery cells, and
    wherein the central processing unit manages digital power conversion by the conversion module.

2. The apparatus of claim 1, wherein the conversion module comprises a buck converter and a boost converter and wherein one of the buck converter and the boost converter is engaged depending on a type of the one or more battery cells.

3. The apparatus of claim 1, wherein the conversion module further comprises telemetry terminals for communicating operation data.

4. The apparatus of claim 1, further comprising a casing, and wherein the conversion module and the one or more battery cells are housed within the casing and form an integral intelligent battery.

5. An intelligent battery, comprising:
    a casing;
    one or more battery cells housed within the casing; and
    a conversion circuit housed within the casing, the conversion circuit adapted to perform digital power conversion;
    wherein the conversion circuit controls a voltage conversion to convert a voltage level of the one or more battery cells to a voltage level corresponding to load requirement, and
wherein the conversion circuit controls a charging of the battery cells to provide an external DC voltage to the battery cells according to charging requirements of the battery cells;
    wherein the conversion circuit further comprises programming means enabling the conversion circuit to provide output power characteristic of at least one of an alkaline battery, a lithium ion battery, a metal hydride battery, a Nickel-Cadmium battery, and a Nickel-Metal-Hydride battery, regardless of a type of the one or more battery cells housed within the casing.

6. The intelligent battery of claim 5, wherein the conversion circuit comprises a digital integrated circuit.

7. The intelligent battery of claim 5, wherein the conversion circuit comprises a charge/discharge unit; a battery protection unit; and an internal DC regulation unit.

8. An intelligent battery power delivery apparatus, comprising:
    input terminals receiving power from one or more battery cells;
    output terminals for providing power to a load; and,
    a conversion module configured to maintain output power characteristics at the output terminals according to programmed characteristics, and configured to control power draw at the input terminals according to programmed characteristics;
    wherein the conversion module comprises:
    a charge/discharge unit;
    a battery protection unit; and
    an internal DC regulation unit,
    wherein the charge/discharge unit is adapted to provide over-current protection during discharge of the one or more battery cells and to control charging schemes used by the intelligent battery power delivery apparatus,
    wherein the battery protection unit is adapted to monitor voltage on, current from, and charge of the one or more battery cells and to alert the central processing unit of pre-programmed potentially hazardous conditions, and
    wherein the internal DC regulation unit regulates a voltage required by the conversion module.

9. The intelligent battery power delivery apparatus of claim 8,
    wherein the conversion module further comprises a telemetry port for communicating with an outside device, and
    wherein the central processing unit is configured to communicate with the outside device via the telemetry port.

10. The apparatus of claim 8, wherein the conversion module comprises an integrated circuit.

11. The apparatus of claim 10, wherein the conversion module comprises a DC/DC converter.

12. The apparatus of claim 10, wherein the conversion module comprises a buck converter and a boost converter and wherein one of the buck converter and the boost converter is engaged depending on the type of the one or more battery cells.

13. The apparatus of claim 8, wherein the battery protection unit comprises a fuel gauging unit for monitoring a state of charge of the one or more battery cells.

14. The apparatus of claim 13, wherein the conversion module further comprises a current sensor.

15. The apparatus of claim 8, wherein the conversion module further comprises telemetry terminals for communicating operation data.

16. The apparatus of claim 15, further comprising a casing, wherein the conversion module and the one or more battery cells are housed within the casing and form an integral intelligent battery.

* * * * *

UNITED STATES PATENT AND TRADEMARK OFFICE
CERTIFICATE OF CORRECTION

| | | |
|---|---|---|
| PATENT NO. | : 8,319,471 B2 | Page 1 of 1 |
| APPLICATION NO. | : 11/951562 | |
| DATED | : November 27, 2012 | |
| INVENTOR(S) | : Meir Adest et al. | |

It is certified that error appears in the above-identified patent and that said Letters Patent is hereby corrected as shown below:

On the Title Page, Item (56)

Page 5, Column 1, Other Publications, Line 29:
    Delete "Instutte" and insert --Institute--

Page 5, Column 1, Other Publications, Line 34:
    Delete "Coupany," and insert --Company,--

In the Specification

Column 2, Background, Line 15:
    Delete "spinnel" and insert --spinel--

In the Claims

Column 9, Line 34:
    In Claim 1, delete "apparatus," and insert --apparatus--

Column 10, Line 5:
    In Claim 5, delete "battery," and insert --battery--

Column 10, Line 30:
    In Claim 8, delete "apparatus," and insert --apparatus--

Signed and Sealed this
Twenty-ninth Day of September, 2015

Michelle K. Lee
*Director of the United States Patent and Trademark Office*